United States Patent [19]
Kratochvil

[11] Patent Number: 5,435,377
[45] Date of Patent: Jul. 25, 1995

[54] VENTILATOR WITH AIR-TO-AIR HEAT EXCHANGER AND PRESSURE RESPONSIVE DAMPER

[75] Inventor: Joseph M. Kratochvil, Ontario, Canada

[73] Assignee: Jullan Enterprises Ltd., Ontario, Canada

[21] Appl. No.: 92,875

[22] Filed: Jul. 19, 1993

[51] Int. Cl.⁶ .......................... F24H 3/02; F24F 7/10
[52] U.S. Cl. .................................... 165/54; 165/154; 454/241; 454/249; 454/253; 34/86
[58] Field of Search ............... 165/54, 154; 454/241, 454/243, 249, 253; 236/49.3; 34/86

[56] References Cited

U.S. PATENT DOCUMENTS

| 1,529,711 | 3/1925 | Parrott et al. | 454/243 |
| 1,825,498 | 9/1931 | Wogan | 165/54 |
| 2,467,018 | 4/1949 | Eggleston | 236/49.3 |
| 4,744,409 | 5/1988 | Berner | 165/54 |
| 4,952,283 | 8/1990 | Besik | 165/54 |
| 5,000,081 | 3/1991 | Gilmer | 165/54 |
| 5,036,906 | 8/1991 | Rylewski | 165/54 |
| 5,117,563 | 6/1992 | Castongway | 34/86 |
| 5,239,834 | 8/1993 | Travers | 165/54 |

FOREIGN PATENT DOCUMENTS

| 2844885 | 4/1980 | Germany | 165/54 |
| 0119437 | 9/1981 | Japan | 454/249 |
| 0055338 | 4/1982 | Japan | 165/54 |
| 0058086 | 4/1982 | Japan | 165/154 |
| 2014720 | 8/1979 | United Kingdom | 165/54 |

*Primary Examiner*—John K. Ford
*Attorney, Agent, or Firm*—Shoemaker and Mattare Ltd.

[57] ABSTRACT

A ventilator for clothes dryers and the like includes a counterflow heat exchanger through the wall of the building containing the apparatus, with an entry passage for ambient air entering the building and an exist passage for heated waste air leaving the building. An external housing defines an outlet chamber communicating with the exit passage, and an inlet chamber communicating with the entry passage. The chambers are both open to the ambience, and the two openings are adjacent one another, with a damper mounted for pivotal movement between a closed position in which the damper closes both of the openings, and an open position in which it opens both of the openings. The damper is biased toward the closed position, but is moveable toward the open position by a build-up of air pressure in the exit passage.

6 Claims, 1 Drawing Sheet

VENTILATOR WITH AIR-TO-AIR HEAT EXCHANGER AND PRESSURE RESPONSIVE DAMPER

FIELD OF INVENTION

The invention relates to an apparatus for use in providing "make-up" outdoor air to a building in which a negative pressure has been created as a result of the indoor air being mechanically exhausted from the building by a particular device or system. This development will be described below with reference to a domestic clothes dryer, but it is to be understood that the same principle and structure could be applied with other apparatus that ejects heated and conditioned air into the environment.

BACKGROUND OF THIS INVENTION

As with all mechanical air-exhausting devices, a clothes dryer, when operating, places a burden on the air handling, heating, and conditioning systems in a building. Already heated and conditioned air is lost to the atmosphere, and as a result, outdoor air needs to be admitted and conditioned to replace it. The common vent associated with a clothes dryer provides only a means whereby the exhaust air can escape to the atmosphere. What is needed is a means whereby "make-up" outdoor air is preheated and admitted into the building while the clothes dryer is operating.

GENERAL DESCRIPTION OF THIS INVENTION

This invention addresses the need to provide "make-up" outdoor air to a space such as a house, in which a clothes dryer or similar device under normal operation uses already heated and conditioned indoor air and exhausts it to the ambience. By allowing "make-up" outdoor air to enter the house for consumption by the clothes dryer, the invention permits the house to retain its heated and conditioned air, and thereby complements other air handling, heating and conditioning equipment dedicated to that end. One direct benefit of the invention is a saving in energy costs associated with heating and cooling. A further benefit of the invention is that, by providing an air inlet opening, outdoor air is drawn into the building in a controlled fashion, whereby unwanted drafts and infiltration throughout the rest of the building are correspondingly decreased. The invention is intended to replace the common vent associated with a clothes dryer, and be installed in the same manner, without the alteration of existing wall openings currently provided. Through suitable adaptation, this invention can be applied to similar systems on a larger or smaller scale.

BRIEF SUMMARY OF THE INVENTION

Accordingly, this invention provides a ventilator for use with apparatus which generates waste heated air, comprising:
 a counterflow heat exchanger adapted to pass through a wall of a building containing the apparatus, the heat exchanger defining an entry passage for ambient air entering the building and an exit passage for heated waste air leaving the building, the passages being juxtaposed such that heat can pass from air in the exit passage to air in the entry passage, but being sealed against communication in order that air at no time can pass from one passage to the other within the ventilator,
 a housing external to the building and defining: an outlet chamber in communication with said exit passage, and an inlet chamber in communication with said entry passage, each chamber having an opening to the ambience, the two openings being substantially adjacent and directed substantially downwardly, and
 a damper mounted to the housing about a substantially horizontal axis, the damper being adapted to move pivotally between a closed position in which it closes both of said openings and an open position in which it opens both of said openings, the damper being biased toward said closed position, and being movable toward said open position by a build-up of air pressure in the exit passage, and
 a vane on the damper and movable therewith, the vane being configured such that it promotes the full opening of the damper with respect to the inlet chamber when air is being expelled from the outlet chamber.

DESCRIPTION OF THE DRAWING

One embodiment of this invention is illustrated in the accompanying drawings, in which like numerals denote like parts throughout the several views, and in which.

DETAILED DESCRIPTION OF THE INVENTION

The principle upon which this invention relies for its operation is that an operating clothes dryer, as it exhausts air from a house, creates a partial vacuum or negative pressure in the house. This negative pressure causes "make-up" outdoor air to be drawn into the house, to replace the exhausted air.

Figure 1:
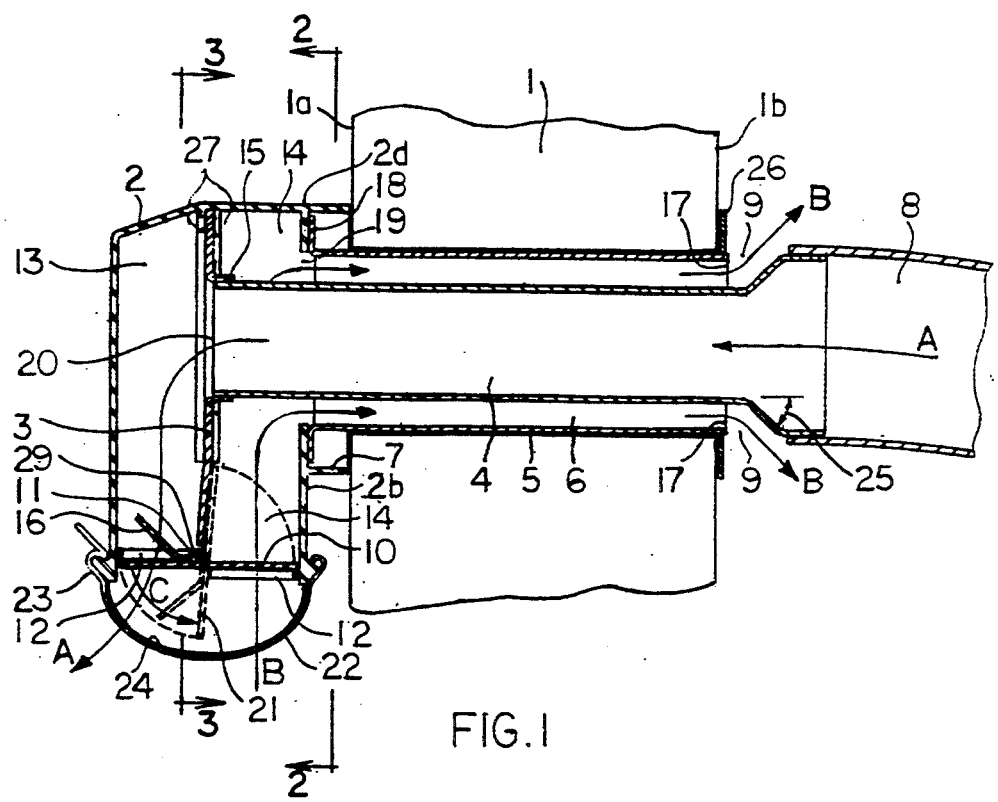
FIG. 1 is a vertical axial cross-sectional view of the ventilator according to the invention shown installed in a conventional wall opening.

In FIG. 1, the exterior wall 1 of a house is pierced by a cylindrical hole of such diameter as would permit the installation of a common clothes dryer vent.

Hot "waste" air follows directional arrows "A" as it is exhausted from a clothes dryer (not shown). The exiting air first enters a cylindrical, metallic inner duct 4 from a clothes dryer exhaust hose 8, and then enters an outlet chamber 13 defined by a housing 2, through a circular hole 20 in a baffle plate 3. The angle of enlargement 25 of the inner duct 4 is such that the laminar flow of the exhaust air will not be adversely affected upon entering the constricted portion of the inner duct 4. The velocity pressure of the exhaust air passing through the outlet chamber 13 opens a damper 10 (shown in its closed position)—simultaneously communicating the outlet chamber 13 and an inlet chamber 14 with the ambience—by pushing downwards on that portion of the damper 10 covering the outlet chamber 13, causing it to pivot around a pivotal axis 11, (directional arrow C) to an open position 21 (shown in broken line).

Thereby the exhaust air is allowed to escape to atmosphere.

As mentioned, the pivotal action moves the damper 10 upwards on the inlet side and opens the inlet chamber 14. The negative pressure left in the house by the exhausted air causes outdoor "make-up" air to be drawn into the house (directional arrows "B") via the inlet chamber 14, an annular space 6 (defined between the inner duct 4 and a cylindrical outer duct 5), and an annular gap 9. The inlet chamber 14 surrounds the inner duct 4, and allows the make-up air to enter the annular space 6 across its entire cross-sectional area.

The configuration, selected materials of construction, proportions and dimensions of the invention are such that they facilitate a transfer of heat from the hot exhaust air in the outlet chamber 13 and inner duct 4 to the outdoor "make-up" air (entering the house) in the inlet chamber 14, and in the annular space 6. Under steady state operating conditions during the heating season, there is sufficient heat transfer to raise the temperature of the incoming "make-up" air to near indoor temperature levels. During the cooling season, the incoming "make-up" air will tend to be well above normal indoor temperature levels. However, since it is the intent of the invention to provide "make-up" air solely for consumption by the dryer, existing indoor temperatures will be virtually unaffected.

Figure 2:
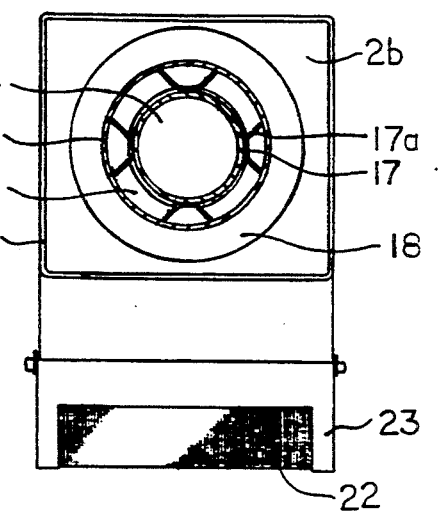
FIG. 2 is a vertical sectional view taken at the line 2—2 in FIG. 1.

FIG. 2 shows the inner duct 4 held in concentric relation to the outer duct 5 by means of four metal V-shaped fins 17, each being the same length as the outer duct 5. The fins 17 are mechanically fastened to the outer surface of the inner duct 4 parallel to its axis, and are disposed at radial positions 90 degrees from each other and with their "legs" 17a protruding outwards. The preferred embodiment of the fins 17 utilizes a thin gauge corrosion-proof metal whose properties include the required degree of "flexibility" or "springiness". The legs 17a, being somewhat longer than the width of the annular space 6, are splayed apart upon assembly and insertion into the outer duct 5, whereby they impose an outward radial pressure on the inner surface of the outer duct 5 which then maintains the separation and concentricity of the inner and outer ducts. Longitudinally, the fins 17 are positioned flush with the end of the outer duct 5, so as to create a gap 9 which has the same (or greater) circumferential area as the cross-sectional area of the annular space 6.

Where the outer duct 5 is fastened to the back wall 2b of the housing 2 the housing has a circular hole 19, of the same diameter as the outer duct 5. The outer duct 5 has a flange 18, whereby it is fastened to the housing 2, concentrically with the circular hole 19.

Baffle plate 3 has a circular hole 20 in a position concentric with the circular hole 19 in the housing 2. Circular hole 20 has a collar 15 around its perimeter of such diameter as to facilitate a tight friction fit with the outer surface of the inner duct 4. The inner duct 4 is then fastened to collar 15 for rigidity.

Baffle plate 3 is held in position in the housing 2 by the friction fit between two ribs 27 on the inside surfaces of the sides 2c and top 2d of the housing 2. Baffle plate 3 is angled beneath the ribs 27 in such a manner as to permit the maximum opening into the inlet chamber 14 when the damper 10 is in its open position 21. In addition, the angled bottom portion of the baffle plate prevents the damper 10 from pivoting through an arc beyond which the damper would not close under the force of gravity.

The housing 2 is made of a plastic material whose chemical and physical properties render it resistant to deterioration or damage caused by exposure to the sun, outdoor temperature extremes, and thermal shock. Further, it must remain dimensionally stable in order to allow the combination outlet/inlet damper 10 to operate freely.

A further feature in the illustrated embodiment of the housing 2 is the rectangular spacer cowl 7 that symmetrically surrounds flange 18 and protrudes outwards from the rear wall 2b flush with the sides 2c and top 2d of the housing. Upon installation of the device of the invention in a wall, the cowl provides clearance for the insect screen removal (described below), and may be "profiled" to provide a close fit against the exterior surface 1a of the exterior wall 1 for caulking and sealing.

At the inside face 1b of the exterior wall 1 a closure flange 26 is fitted and secured around the outside perimeter of the outer duct 5.

The illustrated embodiment of the invention includes a flexible, corrosion proof metal insect screen 22, bonded to a flexible frame 23 generally preshaped to the curvature 24 of the bottom edges of the sides 2c of the housing 2. The insect screen 22 and the flexible frame 23 are removable together for cleaning purposes. A means whereby the insect screen 22 and frame 23 together are rendered "removable" without the use of tools, is depicted in FIG. 1. The means depicted would allow the insect screen and frame to be simply "clipped" on or off.

Figure 3:
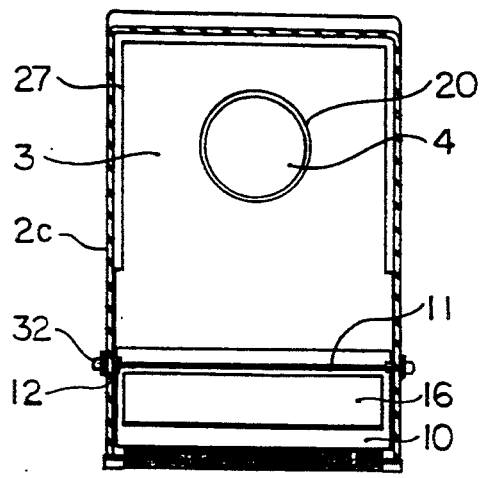
FIG. 3 is a vertical sectional view taken at the line 3—3 in FIG. 1.

FIG. 3 shows the outlet/inlet damper 10 in combination with a vane 16, in the open position. The vane 16 is of such dimensions as to clear the weather strip 12 and not impede the movement of the damper 10.

Figure 4:
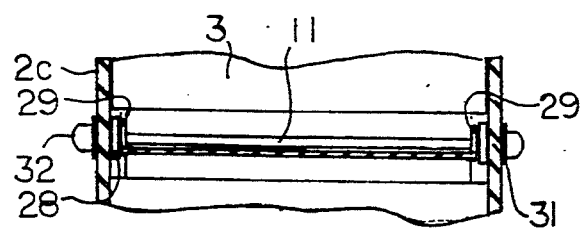
FIG. 4 is an enlarged vertical sectional view of a portion of the ventilator of FIG. 1.

FIG. 4 shows two tabs 29 as components of the damper 10, positioned one on each side. Drilled holes 31 in common alignment and like diameter, are provided through both tabs 29 and both sides 2c of the housing 2 coincident with the pivotal axis 11. A pivot pin is provided by a corrosion-proof metal rod of such diameter and such length as to pass freely through the holes 31 in the tabs 29 and sides 2c. The pivot pin is fastened and held in place by two closed end nuts 32. Two nylon washers 28 are provided, one on each side between the tabs 29 and sides 2c, to provide clearance between the damper 10 and the housing.

Figure 5:
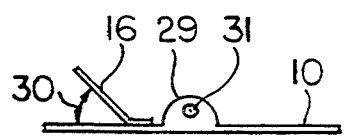
FIG. 5 is an end view showing a combination exhaust/inlet damper for use with this invention.

FIG. 5 shows the positioning of the vane 16, and one of the two tabs 29, with hole 31. The vane 16 is fastened to the top of the damper 10 parallel with the pivotal axis 11, and located on that portion which covers the exhaust chamber 13. Vane 16 is attached in such manner and at such angle 30 as to restrict the exhaust chamber 13 opening to a point where the velocity pressure of the exhaust air, acting upon the damper 10, will cause the damper to open downwards on the exhaust side, and to reach its fully open position (upwards) on the inlet side, thereby providing an unobstructed opening into the inlet chamber 14 for the "make-up" air to enter.

A further embodiment of the damper 10 includes the balancing and positioning of the pivotal axis 11 of the damper such that the portion of the damper covering the inlet chamber 14 is made heavier than that portion which covers the exhaust chamber 13. Thereby, under no (air) flow conditions (clothes dryer not operating), the damper 10 would move to its horizontal closed position by the force of gravity acting upon the (heavier) portion covering the inlet chamber 14. In its horizontal closed position the damper 10 rests against a peripheral resilient weatherstrip 12, fastened to the inside face of the housing 2.

In order to permit the movement of the damper 10, according to the invention, the weatherstrip 12 is fastened in a position above the damper on the outlet chamber 13 side, and below the damper on the inlet chamber 14 side.

While one embodiment of this invention has been illustrated in the accompanying drawings and described hereinabove, it will be evident to those skilled in the art that changes and modifications may be made therein, without departing from the essence of this invention, as set forth in the following claims.

The embodiments of the invention in which an exclusive property or privilege is claimed are defined as follows:

1. A ventilator for use with apparatus which generates waste heated air, comprising:
    a counterflow heat exchanger adapted to pass through a wall of a building containing the apparatus, the heat exchanger defining an entry passage for ambient air entering the building and an exit passage for heated waste air leaving the building, said passages being juxtaposed such that heat can pass from air in the exit passage to air in the entry passage, but being sealed against communication in order that air at not time can pass from one passage to the other within the ventilator,
    a housing external to the building and defining: an outlet chamber in communication with said exit passage, and an inlet chamber in communication with said entry passage, each chamber having an opening to the ambience, the two openings being substantially adjacent and directed substantially downwardly,
    a damper mounted to the housing about a substantially horizontal axis, the damper being adapted to move pivotally between a closed position in which it closes both of said openings and an open position in which it opens both of said openings, the damper being biased toward said closed position, and being movable toward said open position by a build-up of air pressure in the exit passage, and
    a vane on the damper and movable therewith, the vane being configured such that it promotes the full opening of the damper with respect to the inlet chamber when air is being expelled from the outlet chamber.

2. The ventilator claimed in claim 1, in which the damper is biased toward the closed position by the force of gravity.

3. The ventilator claimed in claim 1, in which the entry and exit passages are defined by concentric metallic pipes maintained in concentricity by a plurality of metallic fins located in the annular space defined between the pipes.

4. The ventilator claimed in claim 1, in which the vane projects at an acute angle from the damper.

5. The ventilator claimed in claim 4, in which the damper opens by pivoting away from the outlet chamber and toward the inlet chamber.

6. The ventilator claimed in claim 5, in which the damper in the closed position is sealed with respect to the chambers by weatherstripping.

\* \* \* \* \*